O. D. LENT.
WHEEL.
APPLICATION FILED OCT. 21, 1914.
1,185,112.
Patented May 30, 1916.
2 SHEETS—SHEET 1.
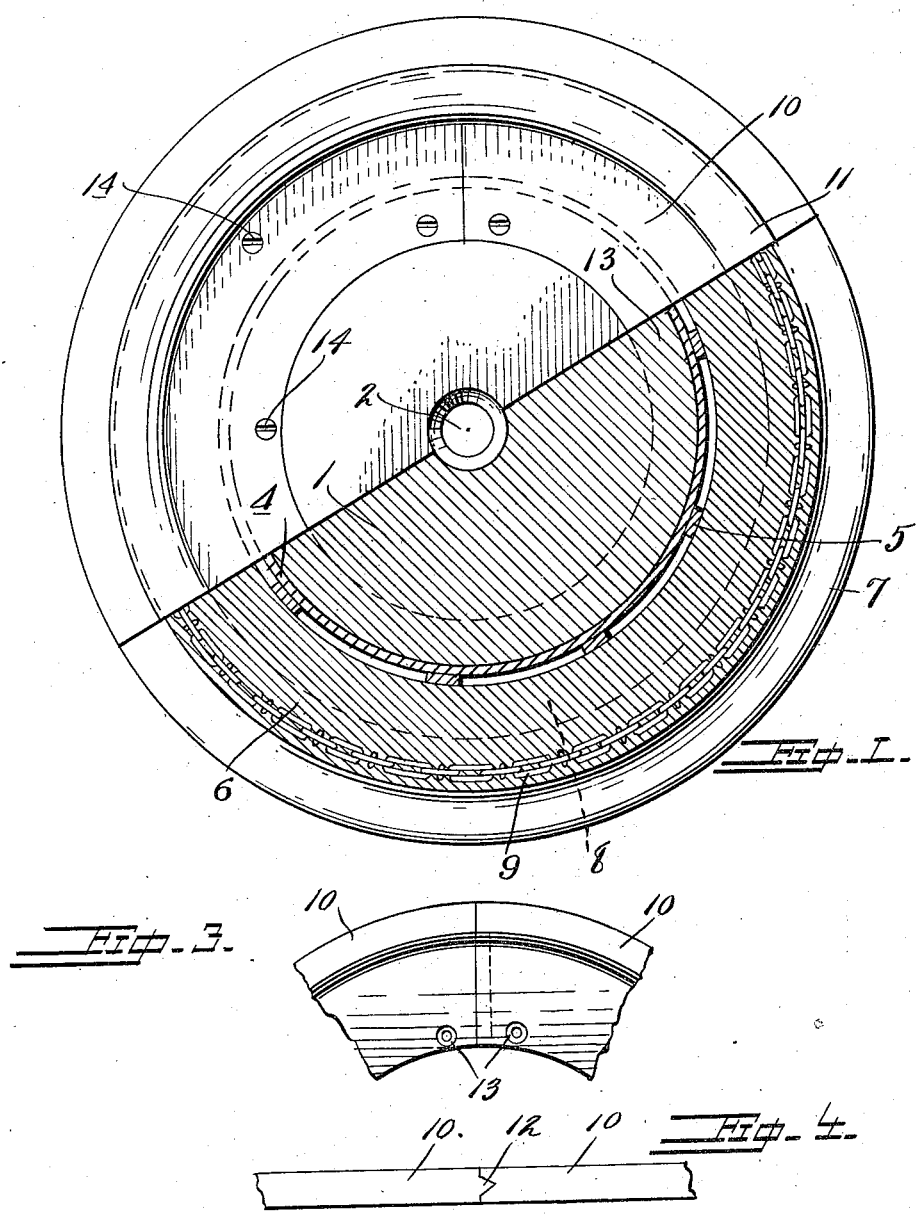
Inventor
Orlando D. Lent.
Witnesses
Edw. S. Hall.
J. P. Campbell.
By Richard B. Owen.
Attorney

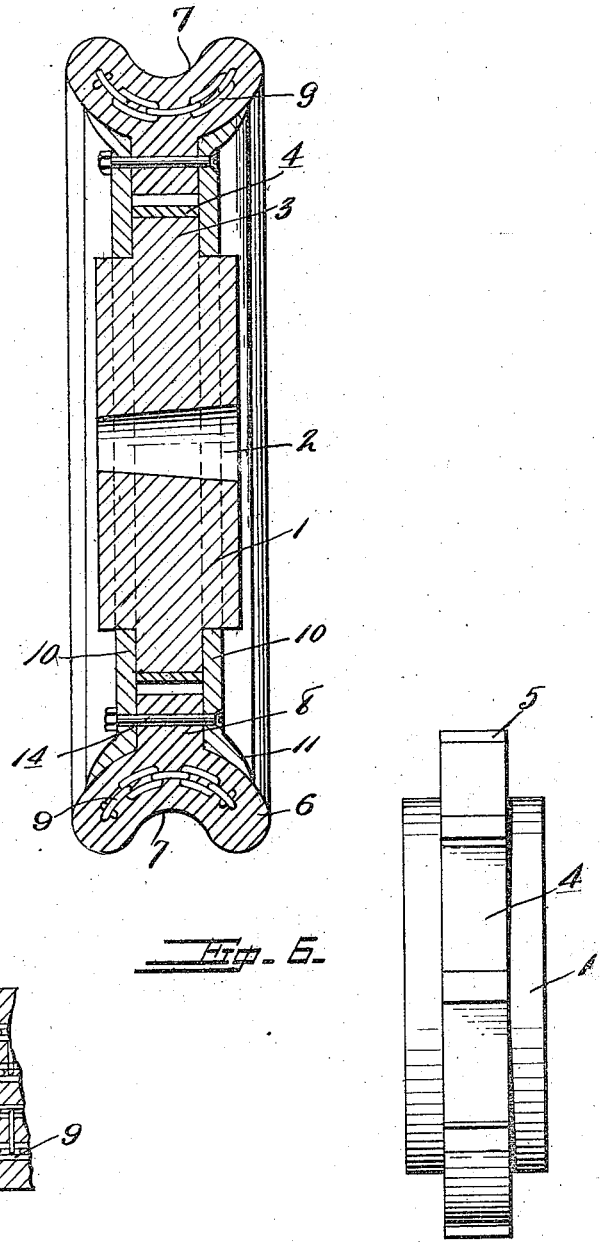

UNITED STATES PATENT OFFICE.

ORLANDO D. LENT, OF PEEKSKILL, NEW YORK.

WHEEL.

1,185,112.  Specification of Letters Patent.  Patented May 30, 1916.

Application filed October 21, 1914. Serial No. 867,811.

*To all whom it may concern:*

Be it known that I, ORLANDO D. LENT, a citizen of the United States, residing at Peekskill, in the county of Westchester and State of New York, have invented certain new and useful Improvements in Wheels, of which the following is a specification.

My invention relates to new and useful improvements in wheels.

The primary object of the invention is the construction of a wheel whereby a solid rubber tire may be used and still gain sufficient resiliency to prevent excessive jarring.

A further object of the invention is the construction of a wheel having a solid rubber tire with a reinforcing element therein.

A still further object of the invention is a wheel provided with means for easily securing the tire thereto or detaching it therefrom.

With these and other objects in view the invention consists in the novel details of construction and arrangement of parts which will be more clearly understood from the following description and drawings, in which, Figure 1 is a view in side elevation, parts broken away. Fig. 2 is a vertical section. Fig. 3 is a fragmental detail showing a side view of the fastening plates. Fig. 4 is a fragmental detail showing an edge view of the fastening plates. Fig. 5 is a fragmental longitudinal section through the tire, and Fig. 6 is an edge view of the hub and bridge pieces.

In carrying out my invention I provide a hub 1 having the central bore 2 therethrough and preferably tapered, as clearly shown in Fig. 2 of the drawings. A circumferential flange 3 is formed centrally of the hub and secured around the top of the flange is a rubber strip or tire 4 having the cross pieces or bridges 5 secured thereto. These bridges are preferably of rubber, but may be equally as well formed of any other suitable material.

A tire 6 having the circumferential groove or channel 7 formed on the outer face thereof is adapted to be secured around the flange 3 on the hub and said tire is provided with an extension 8 which rests upon the bridges 5 secured to the strip or tire 4. A reinforcing element 9, in the present instance shown as a chain composed of a plurality of links, is embedded in the tire and conforms to the shape thereof.

For securing the tire to the hub I have provided sectional plates 10 one of which is fastened on each side thereof. These plates are provided with the curved flange 11 which engage the underside of the tire, as more clearly shown in Fig. 2 of the drawings, and one of the sections of each plate is provided with a groove and the other section with a tongue 12 engaging in the groove, as clearly shown in Figs. 3 and 4 of the drawings. By this construction a tight water proof joint is formed between the ends of the sections and prevents moisture from entering and lodging between the tire and hub. It will be noted that the plates when in position engage the flange 3 upon the hub as well as the extension 8 on the tire and two rows of circumferentially spaced openings 13 are formed in the plates to receive the bolts 14, those of one row passing through the flange 3 of the hub and those of the other row passing through the extension 8 formed on the tire.

From the above detailed description of the wheel it will be seen that I have constructed a wheel in which a solid rubber tire may be used and still secure sufficient resiliency to prevent excessive jarring. The extension 8 of the tire engaging the bridge pieces 5 formed on the strip or tire 4 allows for the extension to sink or enter between the bridge pieces when weight is put upon the wheel. Further resiliency is secured by forming the groove or channel 7 in the outer face of the tire and the reinforcing member 9 merely holds the tire from losing its shape and adding strength thereto. It will be further seen that I have provided a wheel so constructed whereby the tire may be easily removed from the hub by merely removing the bolts and detaching the sections of the side plates. Still further advantage is secured in having the groove 7 formed on the face of the tire as the wheel will not sink in soft ground as readily as is the case with a round tire and when in soft ground so separates the ground that no resistance is placed against the tire to prevent the rotation of the wheel.

Having fully described the invention what I claim as new and desire to secure by Letters Patent is:—

A wheel, comprising a hub having a central circumferential flange thereon, a resilient band arranged about the periphery of the flange, cross pieces secured to the band, a tire provided with a reduced dependent circumferential flange adapted for engagement with the cross pieces, a flexible member arranged interiorly of the tire and provided with a plurality of spurs engageable with the tire whereby movement of said flexible member with relation to the tire will be prevented, and means whereby the tire may be secured to said hub.

In testimony whereof I affix my signature in presence of two witnesses.

ORLANDO D. LENT.

Witnesses:
DUDLEY M. POST,
WALTER W. WIGMAN.

Copies of this patent may be obtained for five cents each, by addressing the "Commissioner of Patents, Washington, D. C."